United States Patent [19]

Schilling et al.

[11] Patent Number: 4,997,870

[45] Date of Patent: Mar. 5, 1991

[54] PROCESS FOR THE PREPARATION OF POLYVINYL ALCOHOLS WHICH ARE SOLUBLE IN COLD WATER AND HAVE BEEN ABSORBED ONTO PIGMENTS

[75] Inventors: Bernd Schilling, Schopenhauerweg; Karl E. Fickert, Goethestrasse; Joachim Schulze, Paganiniweg, all of Fed. Rep. of Germany

[73] Assignee: Wacker Chemie GmbH, Munich, Fed. Rep. of Germany

[21] Appl. No.: 441,632

[22] Filed: Nov. 27, 1989

[51] Int. Cl.$^5$ ................................................ C08K 3/30
[52] U.S. Cl. ..................................... 524/423; 524/425; 524/447; 524/493; 524/557
[58] Field of Search ............... 524/557, 423, 425, 447, 524/493

[56] References Cited

U.S. PATENT DOCUMENTS

| | | | |
|---|---|---|---|
| 3,222,306 | 12/1965 | Suzumura et al. | 524/557 |
| 3,287,313 | 11/1966 | Imoto | 524/557 |
| 3,652,313 | 3/1972 | Nagata et al. | 524/557 |
| 3,738,957 | 6/1973 | Iler | 524/557 |
| 3,773,776 | 11/1973 | Iler | 524/557 |
| 3,829,402 | 8/1974 | Zimmermann | 524/557 |
| 3,915,919 | 10/1975 | Nishioka et al. | 525/58 |
| 4,094,694 | 6/1978 | Long | 524/557 |
| 4,617,060 | 10/1986 | Dreibelbis | 524/557 |

*Primary Examiner*—Joseph L. Schofer
*Assistant Examiner*—J. M. Reddick
*Attorney, Agent, or Firm*—Burgess, Ryan Wayne

[57] ABSTRACT

A process is provided for the preparation of polyvinyl alcohols absorbed onto pigments. In the process 10% to 30% strength by weight of aqueous solutions of partially hydrolyzed polyvinyl alcohols or fully or partially hydrolyzed vinyl alcohol copolymers, which are soluble in cold water, are spray-dried after the addition of 20% to 40% by weight, relative to the total solids content of the resulting suspension, of organic or inorganic pigments, preferably chalk. The invention is also directed to the pulverulent product and its use, wherein the product is distinguished by good flow capacity and an extremely low methanol content. It is suitable for use as a binder in paper coating compositions and in coatings for the surface finishing of paper and cardboard.

8 Claims, No Drawings

PROCESS FOR THE PREPARATION OF POLYVINYL ALCOHOLS WHICH ARE SOLUBLE IN COLD WATER AND HAVE BEEN ABSORBED ONTO PIGMENTS

BACKGROUND OF THE INVENTION (1) Field of the Invention

The invention relates to a process for the preparation, by spray-drying, of polyvinyl alcohols which are soluble in cold water and have been absorbed onto pigments.

(2) Description of the Related Art

Water-soluble, natural, semi-synthetic or fully synthetic polymers are employed in the preparation of industrial coatings, such as, for example, protective films for fabrics or pigmented paper coatings. Polymers, such as polyvinyl alcohols, containing polyhydroxyl groups are of particular importance among fully synthetic, water-soluble polymers. Polyvinyl alcohols are not only excellent binders for pigments for use in the preparation of extra white paper, but due to their carrier properties for optical brighteners, they surpass the water-soluble natural polymers, such as, for example, starch and the cellulose ethers prepared semi-synthetically, such as, for example, carboxymethylcellulose (see H. G. Oesterlin, Das Papier 36, 1982, pgs. 66-72, 121-126 and 170-175).

In polyvinyl alcohols, a distinction is made, depending on their degree of hydrolysis, between so-called fully hydrolyzed grades and partly hydrolysed grades (degree of hydrolysis 70-90 mol %). By virtue of their chemical structure, i.e., the hydroxyl group, strong intermolecular hydrogen bonds are formed, particularly in the case of the fully hydrolyzed polyvinyl alcohols, so that high solvation energies are required for dissolution in water (C. A. Finch, Polyvinyl Alcohol, John Wiley 1973, pgs. 22-25). With the exception of low-viscosity partly hydrolyzed polyvinyl alcohols, most of the polyvinyl alcohols employed in industry are, therefore, sparingly soluble in cold water. This constitutes a serious technical disadvantage, since the coating processes are encumbered by the added step of dissolving the polyvinyl alcohol, and additional energy costs associated therewith. Numerous dissolving techniques have already been suggested for improving the solubility of polyvinyl alcohols in cold water.

The solubility in cold water of polyvinyl alcohols can be improved by modifying them chemically, for example, reaction with glyoxylic or benzaldehyde carboxylic acids (German Patent No. 729,774) or with chloroacetic acid (U.S. Pat. No. 2,434,145) or with formaldehyde and sulfamic acid (German Patent No. DE-C 3,109,844).

In U.S. Pat. No. 4,013,805, the solubility in cold water is improved by the copolymerization of water-soluble comonomers, such as, for example, (meth)acrylic acid and maleic acid.

A variant which is of particular interest from the technical point of view for improving solubility in cold water is described in DE-A No. 3,622,820. By copolymerizing vinyl acetate with vinyl esters containing alkyl groups in the alpha-position, such as, for example, isopropenyl acetate, alkyl groups which, after the saponification to give polyvinyl alcohols, effect an interruption in the hydrogen bonds while maintaining the maximum OH number on the ethylene unit, are incorporated into the polymer chain. By this means, the improved solubility in cold water is combined with the pattern of properties of fully hydrolyzed polyvinyl alcohols.

Admittedly, an improvement in the solubility of polyvinyl alcohols in cold water can be obtained by the chemical measures described above. However, in practice, additional solution problems also occur because of the particle morphology of the polyvinyl alcohols prepared in this way.

In the industrial preparation of polyvinyl alcohols by the so-called "band process" or "kneader process" (Ullmann, Volume 19, pg. 376, 1980), unusual non-homogeneous polyvinyl alcohol compositions are obtained after the drying processes, and the particle size distribution of these has to be adjusted from approximately 150 to 750 $\mu$m by time-consuming grinding and air classification processes to be suitable for good solubility in cold water. Major proportions of fine particles having particle sizes <150 $\mu$m result in agglomeration on contact with water, and major proportions of coarse particles having particle sizes >750 $\mu$m, result in extended dissolution times.

The grinding and screening processes rendered necessary by the non-homogeneous particle size distribution are not only technically involved, but also involve considerable safety risks as a result of the potential danger of dust explosions of the polyvinyl alcohol particles. Polyvinyl alcohol particles, as is known, contain residual amounts of methanol from the hydrolysis stage of their preparation. A further disadvantage of the frequently repeated grinding and screening processes for the preparation of particle morphologies soluble in cold water is that there is an increased incidence of metal attrition, which remains in the product and results in loss of quality during application.

It is, therefore, an object of the present invention to convert polyvinyl alcohols into a form soluble in cold water, and which does not have the disadvantages described above. The invention is further distinguished by the presence of methanol-free polyvinyl alcohol particles of uniform particle size distribution and very good solubility in cold water.

Spray-drying, in which aqueous solutions or suspensions of polymers are sprayed through nozzles by means of large quantities of air and are dried, is a technically simple process employed on a large industrial scale for the preparation of redispersible, water-soluble and water-insoluble polymer powders. However, this simple drying process by spray-drying does not give the desired result in the case of the polyvinyl alcohols soluble in cold water described above and in the case of chemically modified polyvinyl alcohols soluble in cold water, such as, for example, the alpha-alkyl substituted copolymers containing polyhydroxyl groups corresponding to DE-A No. 3,622,820. In spray-drying trials of 10% to 20% strength solutions of the abovementioned polymers, cobwebbing and considerable deposition on the walls of the dryers take place.

DE-A No. 2,200,322 relates to a process for the preparation of anhydrous polyvinyl alcohol/pigment preparations having an extremely high pigment content of 80% to 99.5% by weight. The aqueous polyvinyl alcohol/pigment suspension of this process is dried by means of shelf driers, belt conveyor driers, drum driers and fluidized bed driers, preferably drum driers. Admittedly, there is no risk of cobwebbing or wall deposition in this procedure because of the high proportion of pigment. However, due to the high proportion of pigment, the drying of the polyvinyl alcohol/pigment preparation is extremely energy-consuming and hence, uneconomical.

It has been found, surprisingly, that even when a substantially lower proportion of pigment is added to the solutions of the polyvinyl alcohols soluble in cold water, these solutions can be dried without cobwebbing and deposition on the walls.

SUMMARY OF THE INVENTION

The invention relates to a process for the preparation of polyvinyl alcohols and vinyl alcohol copolymers which are soluble in cold water and have been absorbed onto pigments, by spray-drying aqueous solutions thereof having a polymer content of about 10% to about 30% by weight, relative to the total weight of the solution, the spray-drying being carried out after adding organic or inorganic pigments in a ratio of about 20% to about 40% by weight, relative to the total solids content (polyvinyl alcohol+pigment) of the resulting suspension.

DETAILED DESCRIPTION OF THE INVENTION

The process, according to the invention, is suitable for spray-drying aqueous solutions of partially hydrolyzed polyvinyl alcohols which are soluble in cold water or aqueous solutions of fully or partially hydrolyzed polyvinyl alcohol copolymers. In the group of partly hydrolyzed polyvinyl alcohols, aqueous solutions of partially hydrolyzed polyvinyl alcohols having a degree of hydrolysis of about 70 to about 90 mol % and flow viscosities (as a 4% strength aqueous solution) of about 2 to about 20 mPas should be mentioned as preferred. Among the fully or partially hydrolyzed vinyl alcohol copolymers, it is preferable to employ aqueous solutions of fully hydrolyzed copolymers formed from an alkylvinyl ester and vinyl acetate having a content of alkylvinyl ester of about 5 to about 20 mol % and flow viscosities of about 2 to about 20 mPas, and especially aqueous solutions of fully hydrolyzed copolymers formed from an alkylvinyl acetate and vinyl acetate having contents of alkylvinyl acetate of about 5 to about 20 mol % and flow viscosities of about 2 to about 20 mPas.

Prior to spray drying, the partially hydrolyzed polyvinyl alcohols and fully or partially hydrolyzed vinyl alcohol copolymers soluble in cold water are in the form of an aqueous solution having a polymer content of preferably about 10% to about 30% by weight, relative to the total weight of the solution, before the amount according to the invention of pigment is added to them for drying. If the polymer content is less than about 10% by weight, large amounts of water have to be atomized unnecessarily; within this range, operation of the process in uneconomical. If the polymer content is greater than about 30% by weight, the viscosity of the suspensions after mixing in the pigments is too high, leading to depositions on the wall and blockages of the spray nozzles.

Either organic or inorganic pigments can be used in the process according to the invention. It is preferable to employ chalk, gypsum, kaolin, powdered quartz and titanium dioxide. It is particularly preferable to employ chalk. The particle size of the pigments should be between about 2 μm and about 500 μm. Chalk having a particle size of about 2 μm to about 30 μm is particularly suitable.

For the preparation of the products which have been spray-dried in accordance with the invention, the abovementioned additives are first suspended in the solutions of the polyvinyl alcohol homopolymers or copolymers. The pigment content should preferably be about 20% to about 40% by weight, relative to the total solids content (polymer+pigment) of the suspension, and the polyvinyl alcohol content should preferably be about 60% to about 80% by weight, relative to the total solids content of the suspension. The proportion by weight of pigment should not exceed about 40% by weight for economic reasons, since the preparation of spray-dried polyvinyl alcohol/pigment preparations is too energy-consuming if the proportion of pigment is too high. Excessively low proportions by weight of pigment, less than about 20% by weight of the total solids content, result in cobwebbing and wall depositions during the spray-drying, or products of a reduced flow capacity are formed.

The preparation of polyvinyl alcohol/pigment slurries suitable for spray-drying is effected in a customary manner by stirring the pigments, in a liquid form, previously dispersed in water, or in solid form, into the polyvinyl alcohol solution by means of a highspeed stirrer. The total solids content resulting from this should not exceed values between about 10% and about 35% by weight.

The suspensions prepared in this way are finally dried by spray-drying in a drying tower. For this purpose, the suspension is fed, at the same time as hot air, to the head of the spray tower, the suspension being atomized to give fine droplets by the use of spray nozzles or atomizing disks. The temperature of the drying gas, normally air, is usually about 90° to about 150° C.

Using the procedure according to the invention, the spray-drying takes place without cobwebbing or depositions on the wall. The resulting products are very free-flowing, non-caking and virtually methanol-free. The dry product can be rapidly redispersed in water, the polyvinyl alcohol content dissolving without residue in 10 to 30 minutes, and the viscosities adjusted prior to spray-drying being obtained once again.

The particle size of the spray-dried products depends on the particle size of the pigment employed, since its particles are coated with the polyvinyl alcohol component during the spray-drying. Depending on the particle size of the pigment, the particle size of the dry product can accordingly be between about 10 μm and about 500 μm. In contrast, with the particle size distribution of about 150 μm to about 750 μm necessary when pure polyvinyl alcohols are employed, the particle size of the spray-dried polyvinyl alcohols which have been absorbed onto the pigments does not affect the dissolution or dispersion behavior.

A particularly singular feature of the present invention is that, using the process according to the invention, virtually methanol-free products are obtained, such as are demanded nowadays in compliance with increased environmental consciousness.

The pulverulent products prepared by the process according to the invention are particularly suitable for use as a binder in paper coating compositions and in coatings for the surface finishing of paper and cardboard.

In the examples, measurements of viscosity and saponification numbers were made as follows:

Hoppler Viscosity

Flow viscosity using a falling ball viscometer as specified in DIN 53,015 on a 4% strength aqueous solution at 20° C.

Hydrolysis Number mg. of KOH consumed per g of polyvinyl alcohol.

Brookfield Viscosity

Viscosity using a rotational viscometer (Brookfield RTV), as specified in DIN 53,788 at 10 or 100 r.p.m.

The following examples serve to illustrate the invention further.

EXAMPLE 1

7 kg of M05/140 polyvinyl alcohol soluble in cold water, made by Wacker-Chemie (Hoppler Viscosity 5 mPas; saponification number 140) are dissolved in 40 l. of water at room temperature. 3 kg of chalk (hydrocarb/90 made by Omya) are dispersed in the solution for 10 minutes by means of an impeller. The Brookfield viscosity of the slurry, at a solids content of 20% by weight, is 68 mPas at 10 r.p.m. (100 r.p.m. = 70 mPas). The methanol content is 0.16%.

The slurry is dried in an industrial laboratory spray drier (Nubilosa); the yield of dry product is 10 kg. After the dry product has been redispersed to give a slurry of 20% by weight solids content, the Brookfield viscosity remains unchanged (10 r.p.m. = 65 mPas; 100 r.p.m. = 66 mPas). The methanol content of the slurry has fallen to 0.001%.

EXAMPLE 2

7 kg of a fully hydrolyzed vinyl acetate/isopropenylacetate copolymer having an isopropenyl acetate content of 10 mol % (Hoppler viscosity of 5 mPas; saponification number 20) are dissolved in 40 l. of water at room temperature in a manner analogous to Example 1. After 3 kg of chalk has been added to the Brookfield, viscosity of the slurry is 36 mPas at 10 r.p.m. (100 r.p.m. = 34 mPas) and the methanol content is 0.16%.

The Brookfield viscosity remains unchanged after the dry product has been redispersed (10 r.p.m. = 38 mPas; 100 r.p.m. = 37 mPas). The methanol content of the slurry has fallen to 0.001%.

COMPARISON EXAMPLE 1

The polyvinyl alcohol/chalk slurries of Examples 1 and 2 were not spray-dried, but poured in a thin layer onto a drum drier heated with steam (T = 130° C.). In both cases, but particularly with the copolymer from Example 2, a considerable formation of incrustation and plasticization of the polyvinyl alcohol/chalk mixture set in immediately. The lumps of polyvinyl alcohol/chalk plastic stripped off by a doctor-blade could no longer be redispersed in water.

COMPARISON EXAMPLE 2

7 kg of M05/140 polyvinyl alcohols were dissolved in 40 l. of water at room temperature analogously to Example 1. However, only 1 kg of chalk was dispersed into the solution, and the slurry was dried in an industrial laboratory spray drier. Deposits of plastic immediately formed on the walls of the drier, because of the low chalk content. The dry product could no longer be redispersed in water.

What is claimed is:

1. A process for the preparation of a pulverulent product comprised of at least one polymer selected from the group of polyvinyl alcohol and vinyl alcohol copolymers, which are soluble in cold water, and have been absorbed onto pigments, said process comprising the steps of:
    (a) forming an aqueous solution containing from about 10% to about 30% by weight of said polymer based on the total weight of the solution;
    (b) adding to said solution at least one organic or inorganic pigment, in a ratio of from about 20% to about 40% by weight relative to the total solids content (polymer+pigment) to form a dispersion;
    (c) spray-drying the dispersion; and
    (d) thereafter, recovering said pulverulent product.
2. The process as claimed in claim 1, wherein the pigments used are selected from the group consisting of chalk, gypsum, kaolin, quartz powder and titanium dioxide.
3. The process as claimed in claim 1 or 2, wherein the pigment used is chalk.
4. The process as claimed in claim 1 or 2, wherein the particle size of the pigments is between about 2 μm and about 500 μm.
5. The process as claimed in claim 1 or 2, wherein an aqueous solution of partially hydrolyzed polyvinyl alcohols having a degree of hydrolysis of about 70 to about 90 mol % and a flow viscosity of about 2 to about 20 mPas is employed.
6. The process as claimed in claim 1 or 2, wherein an aqueous solution of fully hydrolyzed copolymers formed from an alkylvinyl acetate and vinyl acetate having an alkylvinyl acetate content of about 5 to about 20 mol % and a flow viscosity of about 2 to about 20 mPas is employed.
7. The process as claimed in claim 1 or 2, wherein the total solids content of the dispersions prior to spray-drying is about 10% to about 35% by weight, relative to the total weight of the dispersion.
8. A pulverulent product prepared by the process of claim 1.

* * * * *